(12) United States Patent
Mondal et al.

(10) Patent No.: US 11,267,577 B2
(45) Date of Patent: Mar. 8, 2022

(54) AIRCRAFT HAVING AN ENGINE WING ASSEMBLY

(71) Applicant: General Electric Company, Schenectady, NY (US)

(72) Inventors: Bhaskar Nanda Mondal, Bangalore (IN); Arvind Namadevan, Bangalore (IN); Shankar Jayaraman, Bangalore (IN); Keith EJ Blodgett, Milford, OH (US); Arnab Sen, Bangalore (IN)

(73) Assignee: General Electric Company, Schenectady, NY (US)

( * ) Notice: Subject to any disclaimer, the term of this patent is extended or adjusted under 35 U.S.C. 154(b) by 83 days.

(21) Appl. No.: 16/705,384

(22) Filed: Dec. 6, 2019

(65) Prior Publication Data

US 2021/0171211 A1    Jun. 10, 2021

(51) Int. Cl.
| | | |
|---|---|---|
| *B64D 29/02* | (2006.01) | |
| *B64C 3/36* | (2006.01) | |
| *B64D 27/02* | (2006.01) | |
| *B64C 9/32* | (2006.01) | |
| *B64C 5/06* | (2006.01) | |
| *B64C 5/08* | (2006.01) | |

(52) U.S. Cl.
CPC ............. *B64D 29/02* (2013.01); *B64C 3/36* (2013.01); *B64C 5/06* (2013.01); *B64C 5/08* (2013.01); *B64C 9/323* (2013.01); *B64D 27/02* (2013.01)

(58) Field of Classification Search
CPC ............ B64D 29/02; B64D 27/02; B64C 5/00
See application file for complete search history.

(56) References Cited

U.S. PATENT DOCUMENTS

| | | | |
|---|---|---|---|
| 2,472,763 A | 6/1949 | Rodeck | |
| 2,964,264 A | 12/1960 | Multhopp | |
| 3,018,987 A | 1/1962 | Multhopp | |
| 3,109,614 A | 11/1963 | Steidl | |
| 3,397,854 A * | 8/1968 | Reyle | B64D 27/06 244/55 |
| 3,415,468 A | 12/1968 | Labombarde | |

(Continued)

FOREIGN PATENT DOCUMENTS

| | | |
|---|---|---|
| CA | 2956909 A1 | 2/2017 |
| CN | 107082120 A | 8/2017 |

(Continued)

OTHER PUBLICATIONS

O'Pires et al., Analysis of high Reynolds numbers effects on a wing turbine airfoil using 2D wind tunnel test data, Journal of Physics: Conference Series, 753, 022047, 2016, 9 pages. https://iopscience.iop.org/article/10.1088/1742-6596/753/2/022047/pdf.

(Continued)

*Primary Examiner* — Brian M O'Hara
(74) *Attorney, Agent, or Firm* — Dority & Manning, P.A.

(57) ABSTRACT

An aircraft defining a longitudinal centerline and extending between a forward end and an aft end is provided. The aircraft includes a fuselage extending longitudinally between the forward end of the aircraft and the aft end of the aircraft; a primary wing assembly extending laterally outwardly with respect to the longitudinal centerline from a portion of the fuselage; a first engine mounted to the primary wing assembly; and a first engine wing assembly extending outward from the first engine.

20 Claims, 7 Drawing Sheets

(56) References Cited

U.S. PATENT DOCUMENTS

| | | | |
|---|---|---|---|
| 3,417,946 A | 12/1968 | Hartley | |
| 3,576,300 A | 4/1971 | Palfreyman | |
| 3,744,745 A | 7/1973 | Kerker et al. | |
| 4,050,651 A | 9/1977 | Neal et al. | |
| 4,149,688 A | 4/1979 | Miller, Jr. | |
| D264,838 S | 6/1982 | Dornier | |
| 4,387,866 A | 6/1983 | Eickmann | |
| 4,447,022 A | 5/1984 | Lion | |
| 4,456,204 A | 6/1984 | Hapke | |
| 4,500,055 A | 2/1985 | Krojer | |
| 4,540,143 A | 9/1985 | Wang et al. | |
| 4,605,185 A | 8/1986 | Reyes | |
| 4,685,643 A | 8/1987 | Henderson et al. | |
| 4,917,332 A | 4/1990 | Patterson, Jr. | |
| 4,925,131 A | 5/1990 | Eickmann | |
| D308,663 S | 6/1990 | Carlson et al. | |
| 4,953,812 A | 9/1990 | Van der Hoeven | |
| 4,976,396 A | 12/1990 | Carlson et al. | |
| 4,982,914 A | 1/1991 | Eickmann | |
| 5,096,142 A | 3/1992 | Rodriguez | |
| 5,249,762 A | 10/1993 | Skow | |
| 5,374,010 A * | 12/1994 | Stone | B64C 29/0025 244/12.5 |
| 5,443,229 A | 8/1995 | O'Brien et al. | |
| 6,543,718 B2 | 4/2003 | Provost | |
| 6,575,406 B2 | 6/2003 | Nelson | |
| 6,688,552 B2 | 2/2004 | Franchet et al. | |
| 6,824,092 B1 | 11/2004 | Franklin, III et al. | |
| 6,848,650 B2 | 2/2005 | Hoisignton et al. | |
| 6,921,045 B2 | 7/2005 | Chang et al. | |
| 6,964,397 B2 | 11/2005 | Konings | |
| 7,900,865 B2 | 3/2011 | Moore et al. | |
| 7,900,868 B2 | 3/2011 | Sankrithi et al. | |
| 7,905,449 B2 | 3/2011 | Cazals et al. | |
| 7,926,760 B2 | 4/2011 | Gall et al. | |
| 8,011,613 B2 | 9/2011 | Belleville | |
| 8,074,924 B2 | 12/2011 | Cros | |
| 8,128,023 B2 | 3/2012 | Cazals | |
| 8,181,912 B2 | 5/2012 | Schwetzler | |
| 8,256,709 B2 | 9/2012 | Negulescu | |
| 8,313,055 B2 | 11/2012 | Gall et al. | |
| 8,322,655 B1 | 12/2012 | Kismarton et al. | |
| 8,393,567 B2 | 3/2013 | Moore et al. | |
| 8,628,040 B2 | 1/2014 | Moore et al. | |
| 8,632,032 B2 | 1/2014 | Butler et al. | |
| 8,708,274 B2 | 4/2014 | Lord | |
| 8,720,815 B2 | 5/2014 | Vetters et al. | |
| 8,827,210 B2 | 9/2014 | Schwetzler | |
| 9,475,579 B2 | 10/2016 | Fredericks et al. | |
| 9,540,113 B2 | 1/2017 | Gukeisen | |
| 9,701,395 B2 | 7/2017 | Veilleux, Jr. et al. | |
| 9,764,848 B1 | 9/2017 | Vondrell et al. | |
| 9,914,528 B2 | 3/2018 | Hirano et al. | |
| 9,975,631 B1 | 5/2018 | McLaren et al. | |
| 2006/0011780 A1 | 1/2006 | Brand et al. | |
| 2007/0102575 A1 | 5/2007 | Morgan et al. | |
| 2007/0176047 A1 | 8/2007 | Moore et al. | |
| 2008/0098719 A1 | 5/2008 | Addis | |
| 2008/0099632 A1 | 5/2008 | Addis | |
| 2009/0065632 A1 | 3/2009 | Cazals | |
| 2011/0150645 A1 | 6/2011 | Moore et al. | |
| 2011/0315809 A1 | 12/2011 | Oliver | |
| 2012/0325958 A1 | 12/2012 | Cazals et al. | |
| 2016/0144966 A1 | 5/2016 | Trahmer et al. | |
| 2016/0152318 A1 | 6/2016 | Alexander | |
| 2016/0368590 A1 | 12/2016 | Karem et al. | |
| 2017/0233060 A1 | 8/2017 | Glover et al. | |

FOREIGN PATENT DOCUMENTS

| | | |
|---|---|---|
| DE | 102007027697 A1 | 12/2008 |
| EP | 3205581 A1 | 8/2017 |
| GB | 2486342 A | 6/2012 |
| WO | WO98/21092 A1 | 5/1998 |
| WO | WO2016/134433 A1 | 9/2016 |

OTHER PUBLICATIONS

Application No. BR102017002693-0 filed Feb. 10, 2017.
Office Action issued in connection with corresponding EP Application No. 17155343.1 dated Oct. 25, 2018.
Application No. IN201744004985 filed Feb. 13, 2017.
Application No. JP2017-018088 filed Feb. 3, 2017.

* cited by examiner

AIRCRAFT HAVING AN ENGINE WING ASSEMBLY

FIELD OF THE INVENTION

The present subject matter relates generally to an aircraft, or more particularly to an aircraft having an engine wing assembly.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce the amount of turbulence within the air entering the inlet of each respective turbofan jet engine, which has a positive effect on the net propulsive thrust of the aircraft.

However, engine weight is a critical factor in the overall performance of an aircraft. Engine performance improvement programs often result in higher engine weight which may decrease their potential benefits.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal centerline and extending between a forward end and an aft end is provided. The aircraft includes a fuselage extending longitudinally between the forward end of the aircraft and the aft end of the aircraft; a primary wing assembly extending laterally outwardly with respect to the longitudinal centerline from a portion of the fuselage; a first engine mounted to the primary wing assembly; and a first engine wing assembly extending outward from the first engine.

In certain exemplary embodiments the aircraft includes a first nacelle that circumferentially surrounds a portion of the first engine.

In certain exemplary embodiments the first engine wing assembly includes a first engine wing extending laterally outwardly from a first side of the first nacelle.

In certain exemplary embodiments the first engine wing assembly includes a first engine wing extending laterally outwardly from a first side of the first nacelle and a second engine wing extending laterally outwardly from a second side of the first nacelle opposite the first side of the first nacelle.

In certain exemplary embodiments the primary wing assembly includes a first primary wing extending laterally outwardly with respect to the longitudinal centerline from a first side of the fuselage and a second primary wing extending laterally outwardly with respect to the longitudinal centerline from a second side of the fuselage.

In certain exemplary embodiments the first engine is mounted to the first primary wing, and the aircraft includes a second engine mounted to the second primary wing; a second engine wing assembly extending outward from the second engine; and a second nacelle that circumferentially surrounds a portion of the second engine.

In certain exemplary embodiments the second engine wing assembly includes a third engine wing extending laterally outwardly from a first side of the second nacelle.

In certain exemplary embodiments the second engine wing assembly includes a third engine wing extending laterally outwardly from a first side of the second nacelle and a fourth engine wing extending laterally outwardly from a second side of the second nacelle opposite the first side of the second nacelle.

In certain exemplary embodiments the first engine wing assembly is transitionable between a first position in which the first engine wing assembly provides a lift force and a second position in which the first engine wing assembly provides a brake force.

In certain exemplary embodiments the first engine wing includes a winglet disposed at a wingtip portion of the first engine wing.

In certain exemplary embodiments the first engine wing assembly includes a rear stabilizer extending vertically outwardly from a top side of the first nacelle.

In certain exemplary embodiments a surface of the first engine wing absorbs a portion of heat from the first engine.

In another exemplary embodiment of the present disclosure, a wing assembly for an aircraft defining a longitudinal centerline and extending between a forward end and an aft end and including a fuselage extending longitudinally between the forward end and the aft end is provided. The wing assembly includes a primary wing assembly extending laterally outwardly with respect to the longitudinal centerline from a portion of the fuselage; a first engine mounted to the primary wing assembly; and a first engine wing assembly extending outward from the first engine.

In certain exemplary embodiments the wing assembly includes a first nacelle that circumferentially surrounds a portion of the first engine and a first engine wing extending laterally outwardly from a first side of the first nacelle.

In certain exemplary embodiments the primary wing assembly includes a first primary wing extending laterally outwardly with respect to the longitudinal centerline from a first side of the fuselage and a second primary wing extending laterally outwardly with respect to the longitudinal centerline from a second side of the fuselage.

In certain exemplary embodiments the first engine is mounted to the first primary wing, and the aircraft includes a second engine mounted to the second primary wing; a second engine wing assembly extending outward from the second engine; a second nacelle that circumferentially surrounds a portion of the second engine; and a second engine wing extending laterally outwardly from a first side of the second nacelle.

In certain exemplary embodiments the first engine wing assembly is transitionable between a first position in which the first engine wing assembly provides a lift force and a second position in which the first engine wing assembly provides a brake force.

In certain exemplary embodiments the first engine wing includes a winglet disposed at a wingtip portion of the first engine wing.

In certain exemplary embodiments the first engine wing assembly includes a rear stabilizer extending vertically outwardly from a top side of the first nacelle.

In another exemplary embodiment of the present disclosure, an engine assembly for an aircraft defining a longitudinal centerline and extending between a forward end and an aft end and including a fuselage extending longitudinally between the forward end and the aft end and a primary wing assembly extending laterally outwardly with respect to the longitudinal centerline from a portion of the fuselage is provided. The engine assembly includes an engine mounted to the primary wing assembly and an engine wing assembly extending outward from the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
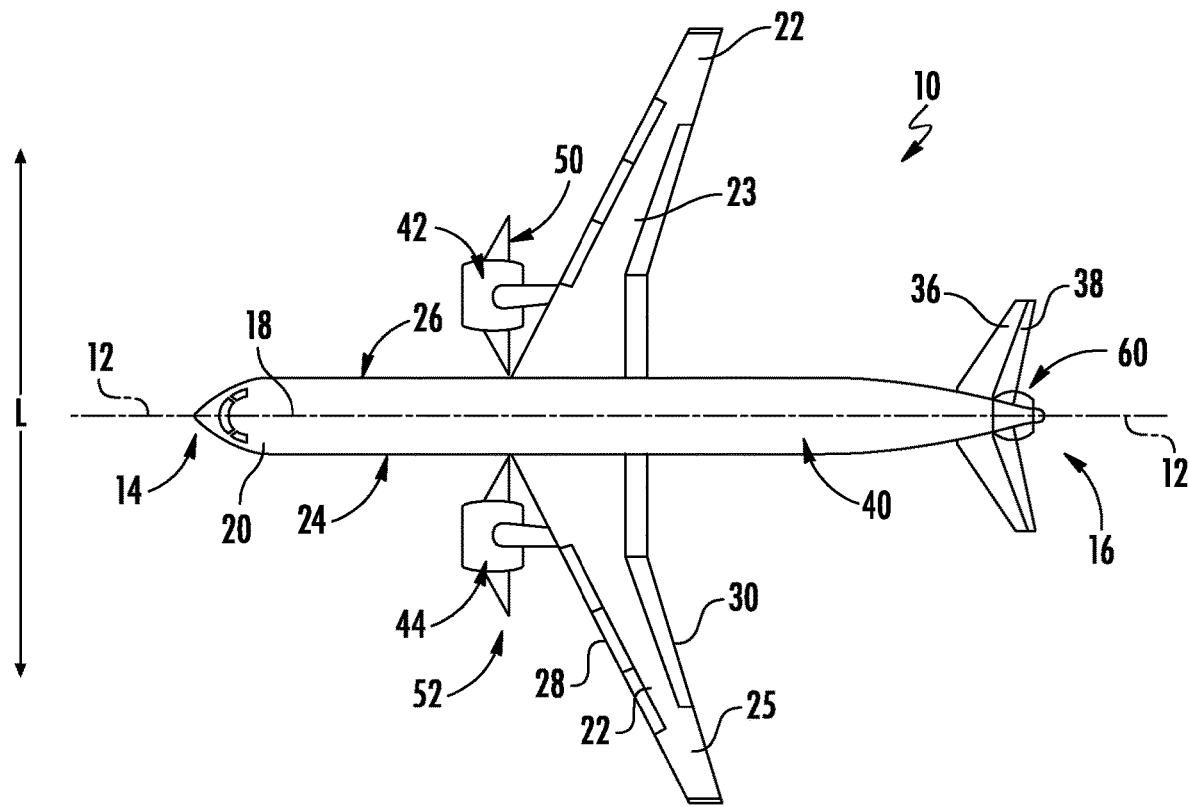
FIG. 1 is a top view of an aircraft including an engine wing assembly in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. The terms "upstream" and "downstream" refer to the relative direction with respect to fluid flow in a fluid pathway. For example, "upstream" refers to the direction from which the fluid flows, and "downstream" refers to the direction to which the fluid flows.

An aircraft of the present disclosure includes an engine assembly including an engine mounted to a primary wing assembly and an engine wing assembly attached to a portion of the engine. In this manner, an engine wing assembly of the present disclosure provides a lift force to support a part of the engine weight. Engine weight is a critical factor in the overall performance of an aircraft. Engine performance improvement programs often result in higher engine weight which may decrease their potential benefits. For example, higher engine weight has ripple effects on the aircraft that cause a large fuel burn penalty. The present disclosure, by attaching an engine wing assembly to a portion of the engine, provides an engine that is able to partially bear its own weight thereby reducing the ripple effects and the large fuel burn penalty.

Figure 2:
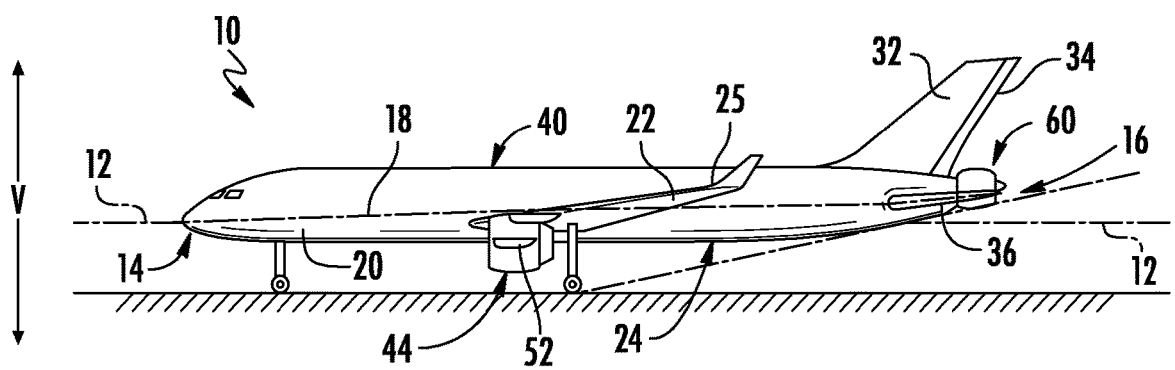
FIG. 2 is a port side view of the exemplary aircraft of FIG. 1 in accordance with an exemplary embodiment of the present disclosure.

Referring now to the drawings, wherein identical numerals indicate the same elements throughout the figures, FIG. 1 provides a top view of an exemplary aircraft 10 including an engine wing assembly of the present disclosure. FIG. 2 provides a port side 24 view of the aircraft 10 illustrated in FIG. 1. As shown in FIGS. 1 and 2 collectively, the aircraft 10 defines a longitudinal centerline 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a primary wing assembly 22. In an exemplary embodiment of the present disclosure, the primary wing assembly 22 includes a first primary wing 23 and a second primary wing 25. For example, the first primary wing 23 extends laterally outwardly with respect to the longitudinal centerline 12 from a first or starboard side 26 of the fuselage 20 and the second primary wing 25 extends laterally outwardly with respect to the longitudinal centerline 12 from a second or port side 24 of the fuselage 20. Each of the primary wings 23, 25 for the exemplary embodiment depicted may include one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

The exemplary aircraft 10 of FIGS. 1 and 2 also includes a propulsion system. In one embodiment, the exemplary propulsion system includes a plurality of aircraft engines, at least one of which is mounted to the primary wings 23, 25. For example, the plurality of aircraft engines includes a first aircraft engine 42 mounted to a first primary wing 23 and a second aircraft engine 44 mounted to a second primary wing 25. In at least certain exemplary embodiments, the aircraft engines 42, 44 may be configured as turbofan jet engines suspended beneath the primary wings 23, 25 in an underwing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Referring to FIG. 1, an aircraft 10 of the present disclosure includes a first engine wing assembly 50 extending outward from the first engine 42 and a second engine wing assembly 52 extending outward from the second engine 44. In this manner, the first engine wing assembly 50 and the second engine wing assembly 52 provide a lift force to support a part of the respective engine 42, 44 weight, as described in more detail below.

As used herein, the term "engine wing assembly" or "engine wing" refers to an engine wing and/or an engine wing assembly extending outward from an engine to provide a lift force to support a part of the respective engine weight thereby reducing the airframe lift requirement. In other words, and in exemplary embodiments of the present disclosure, an engine wing assembly or engine wing of the present disclosure includes an airfoil having a camber. For example, the cambered airfoils of an engine wing of the present disclosure includes an asymmetrical cambered airfoil between the two acting surfaces of the cambered airfoil. The camber may be such as to cause the "engine wing assembly" or "engine wing" to generate lift at about 0% angle of attack, 5%-10% angle of attack, or higher. "About 0%" means between 0.5% up to 5% angle of attack.

Additionally, the propulsion system may include an aft engine 60 mounted to the fuselage 20 of the aircraft 10 proximate the aft end 16 of the aircraft 10, or more particularly at a location aft of the primary wings 23, 25 and aircraft engines 42, 44. The exemplary aft engine 60 is mounted to the fuselage 20 of the aircraft 10 such that the mean line 18 extends therethrough.

Figure 3:
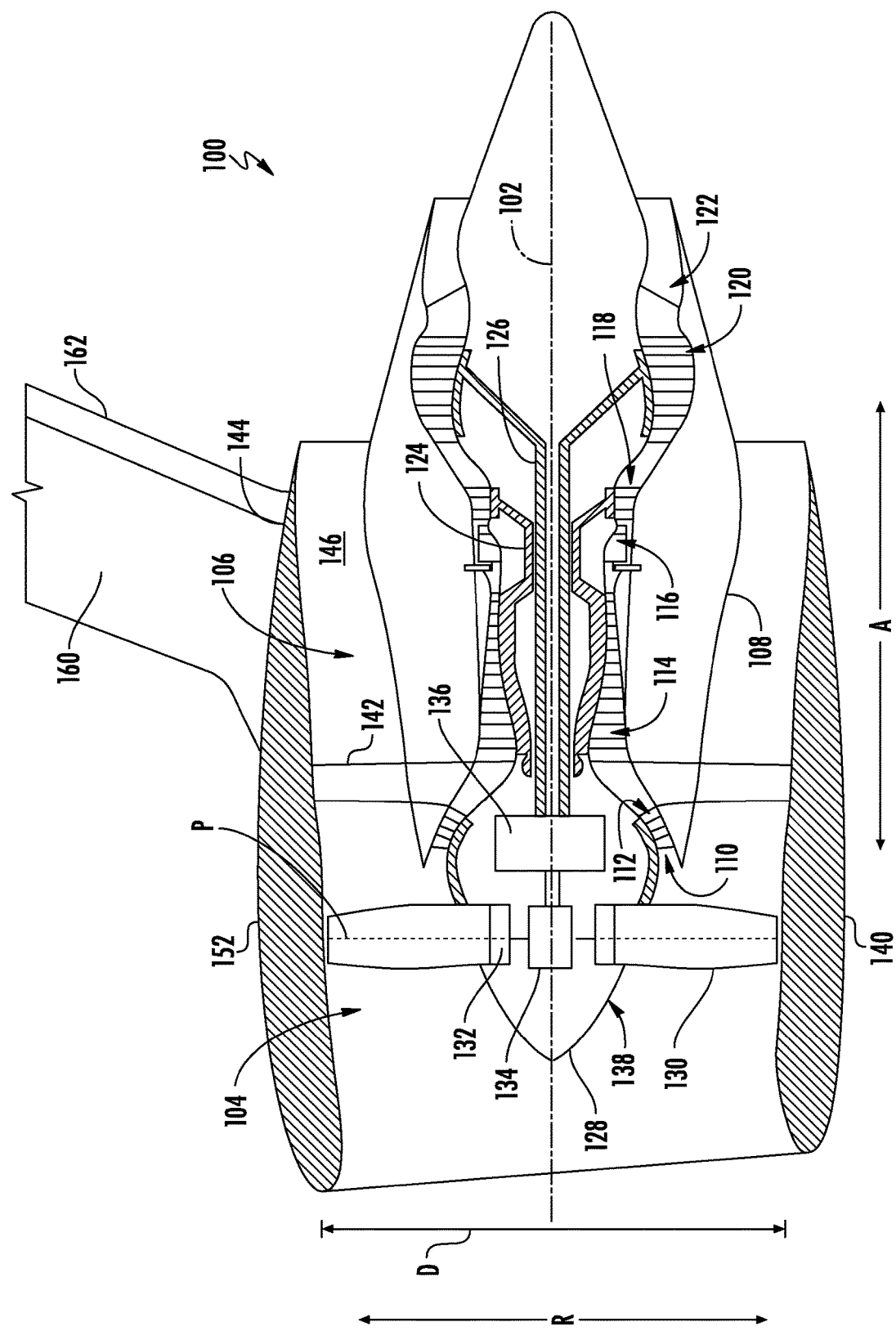
FIG. 3 is a schematic, cross-sectional view of a gas turbine engine including an engine wing assembly in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3.

As shown in FIG. 3, the turbofan engine 100 defines an axial direction A (extending parallel to a longitudinal centerline 102 provided for reference) and a radial direction R. In general, in an exemplary embodiment, the turbofan 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction R and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. The fan blades 130, disk 132, and actuation member 134 are together rotatable about the longitudinal axis 102 by LP shaft 126 across a power gear box 136. The power gear box 136 includes a plurality of gears for adjusting the rotational speed of the fan 128 relative to the LP shaft 126 to a more efficient rotational fan speed.

Figure 7:
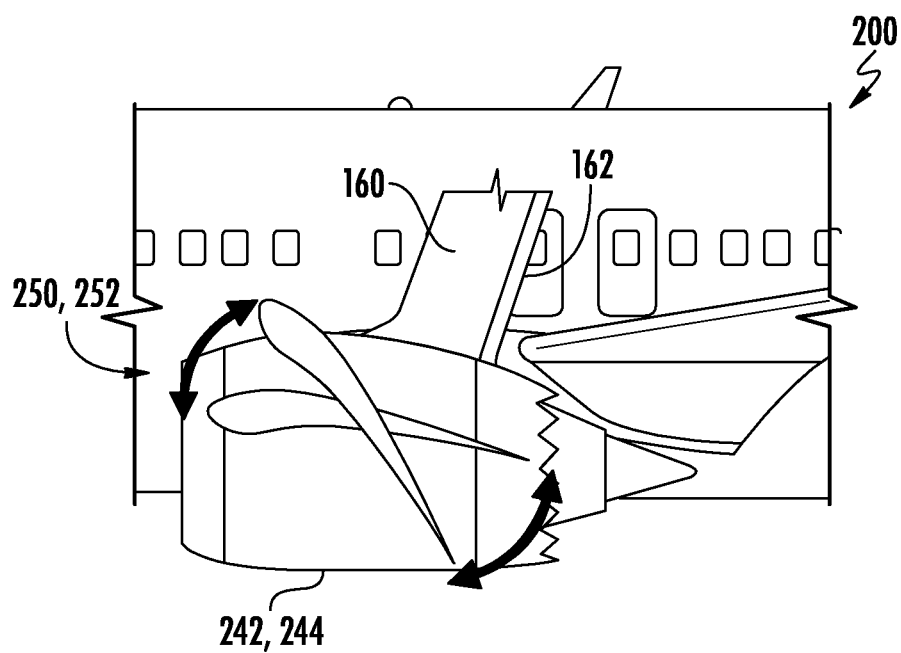
FIG. 7 is a close-up, port side view of an aircraft including an engine wing assembly in accordance with another exemplary embodiment of the present disclosure.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween. In an exemplary embodiment of the present disclosure, a first engine wing assembly 50, 250 (FIGS. 1 and 4) extends laterally outwardly from a first side 264 (FIG. 4) of the nacelle 140, 260 (FIGS. 3 and 4) as described in more detail below. Referring to FIGS. 3 and 7, in one embodiment, the first engine wing assembly 50, 250 (FIGS. 1, 4, and 7) includes a rear stabilizer 160 that extends vertically outwardly from a top side 152 of the nacelle 140. In one embodiment, the rear stabilizer 160 includes a rudder flap 162 for yaw control. Referring to FIGS. 3 and 7, an engine wing assembly 50, 250 (FIGS. 1, 4, and 7) including a rear stabilizer 160 with trim can provide yaw forces which can potentially reduce the size of a vertical tail of the main aircraft.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

FIGS. 4-12 illustrate exemplary embodiments of the present disclosure. The embodiment illustrated in FIG. 4 includes similar components to the embodiment illustrated in FIGS. 1-2, and the similar components are denoted by the same reference numbers. For the sake of brevity, these similar components and the similar steps of using an engine wing assembly 250 (FIG. 4) will not all be discussed in conjunction with the embodiment illustrated in FIG. 4.

As described above and as used herein, the term "engine wing assembly" or "engine wing" refers to an engine wing and/or an engine wing assembly extending outward from an engine to provide a lift force to support a part of the respective engine weight thereby reducing the airframe lift requirement. In other words, and in exemplary embodiments of the present disclosure, an engine wing assembly or engine wing of the present disclosure includes an airfoil having a camber. For example, the cambered airfoils of an engine wing of the present disclosure includes an asymmetrical cambered airfoil between the two acting surfaces of the cambered airfoil. The camber may be such as to cause the "engine wing assembly" or "engine wing" to generate lift at about 0% angle of attack, 5%-10% angle of attack, or higher. "About 0%" means between 0.5% up to 5% angle of attack.

Figure 4:
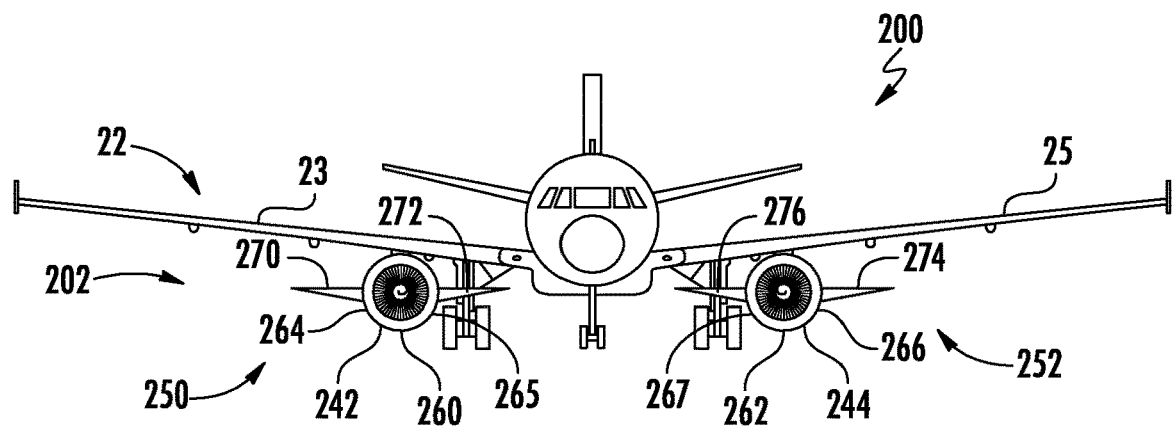
FIG. 4 is a front side view of an aircraft including an engine wing assembly in accordance with an exemplary embodiment of the present disclosure.
Figure 5:
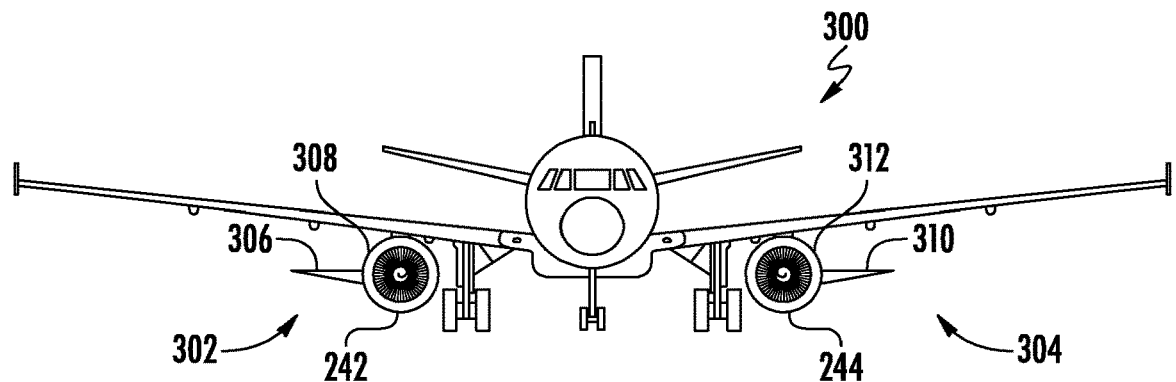
FIG. 5 is a front side view of an aircraft including an engine wing assembly in accordance with another exemplary embodiment of the present disclosure.

Referring to FIG. 4, an aircraft 200 of the present disclosure includes an engine assembly 202 including an engine 242 mounted to a primary wing assembly 22 and an engine wing assembly 250 extending outward from the engine 242. In this manner, the engine wing assembly 250 provides a lift force to support a part of the engine 242 weight. Engine weight is a critical factor in the overall performance of an aircraft. Engine performance improvement programs often result in higher engine weight which may decrease their potential benefits. For example, higher engine weight has ripple effects on the aircraft that cause a large fuel burn penalty. The present disclosure, by attaching an engine wing assembly 250 to a portion of the engine 242, provides an engine 242 that is able to partially bear its own weight thereby reducing the ripple effects and the large fuel burn penalty.

Referring still to FIG. 4, in one exemplary embodiment, an aircraft 200 of the present disclosure includes an engine assembly 202 including a first engine 242 mounted to the first primary wing 23 of the primary wing assembly 22 and a second engine 244 mounted to the second primary wing 25 of the primary wing assembly 22.

Referring to FIGS. 3 and 4, in one embodiment, a first nacelle 260 circumferentially surrounds a portion of the first engine 242 and a second nacelle 262 circumferentially surrounds a portion of the second engine 244.

Referring to FIG. 4, a first engine wing assembly 250 extends outward from the first engine 242 and a second engine wing assembly 252 extends outward from the second engine 244. In an exemplary embodiment, the first engine wing assembly 250 includes a first engine wing 270 extending laterally outwardly from a first side 264 of the first nacelle 260 and a second engine wing 272 extending laterally outwardly from a second side 265 of the first nacelle 260 opposite the first side 264 of the first nacelle 260. In an exemplary embodiment, the second engine wing assembly 252 includes a third engine wing 274 extending laterally outwardly from a first side 266 of the second nacelle 262 and a fourth engine wing 276 extending laterally outwardly from a second side 267 of the second nacelle 262 opposite the first side 266 of the second nacelle 262. In this manner, the first engine wing assembly 250 and the second engine wing assembly 252 provide a lift force to support a part of the respective engine 242, 244 weight. As discussed above, engine weight is a critical factor in the overall performance of an aircraft. Engine performance improvement programs often result in higher engine weight which may decrease their potential benefits. For example, higher engine weight has ripple effects on the aircraft that cause a large fuel burn penalty. The present disclosure, by attaching a first engine wing assembly 250 to a portion of the first engine 242 and a second engine wing assembly 252 to a portion of the second engine 244, provides engines 242, 244 that are able to partially bear their own weight thereby reducing the ripple effects and the large fuel burn penalty.

Referring to FIG. 4, in an exemplary embodiment, the first engine wing 270, the second engine wing 272, the third engine wing 274, and the fourth engine wing 276 are similarly configured as the first primary wing 23 and the second primary wing 25 of the primary wing assembly 22. In one embodiment, the first engine wing 270, the second engine wing 272, the third engine wing 274, and the fourth engine wing 276 are sized and configured to provide a lift force to support a part of the respective engine 242, 244 weight as described herein. In an exemplary embodiment of the present disclosure, an engine wing of the present disclosure, e.g., an engine wing 270, 272, 274, 276, includes an airfoil having a camber. For example, the cambered airfoils of an engine wing 270, 272, 274, 276 of the present disclosure may include an asymmetrical cambered airfoil between the two acting surfaces of the cambered airfoil.

In an exemplary embodiment of the present disclosure, an engine wing 270, 272, 274, 276 of the present disclosure extends outward from an engine 242, 244 a distance greater than a width or diameter of an engine 242, 244. In other words, in some exemplary embodiments, a length of an engine wing 270, 272, 274, 276 of the present disclosure is greater than a width or diameter of an engine 242, 244. In other exemplary embodiments, a length of an engine wing 270, 272, 274, 276 of the present disclosure may be the same as a width or diameter of an engine 242, 244. In still other exemplary embodiments, a length of an engine wing 270, 272, 274, 276 of the present disclosure may be less than a width or diameter of an engine 242, 244.

In some exemplary embodiments, a length of a first engine wing 270, 272, 274, 276 together with a length of a second engine wing 270, 272, 274, 276 is greater than a width or diameter of an engine 242, 244. In other words, in some exemplary embodiments, a length of two engine wings combined is greater than a width or diameter of an engine 242, 244. In other exemplary embodiments, a length of two engine wings combined may be the same as a width or diameter of an engine 242, 244. In still other exemplary embodiments, a length of two engine wings combined may be less than a width or diameter of an engine 242, 244.

In other exemplary embodiments, a length of an engine wing 270, 272, 274, 276 of the present disclosure may have other dimensions and/or other configurations to provide a lift force to support a part of the respective engine weight thereby reducing the airframe lift requirement.

Figure 9:
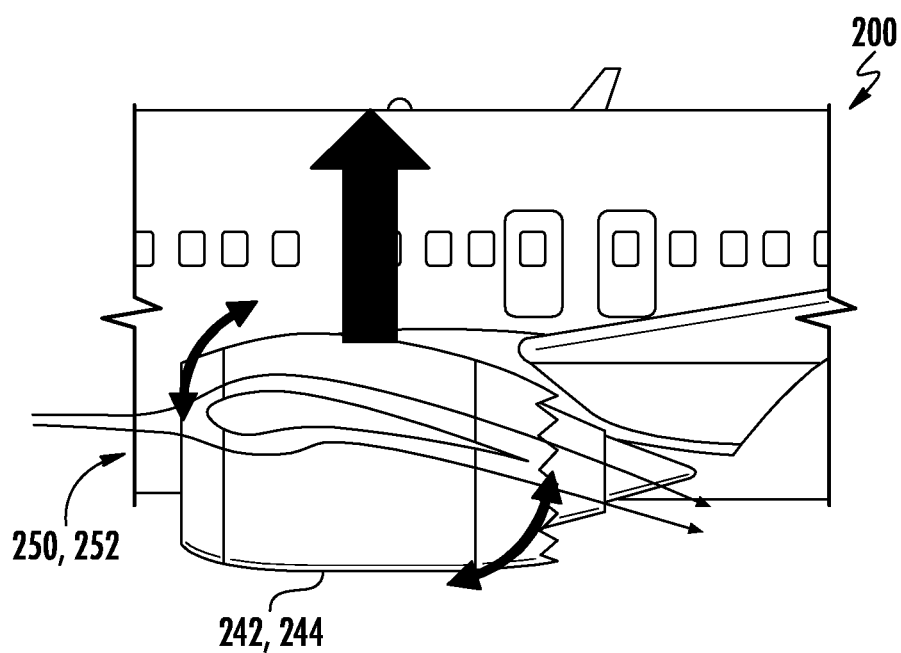
FIG. 9 is a close-up, port side view of an aircraft including an engine wing assembly in a first position in which the engine wing assembly provides a lift force in accordance with another exemplary embodiment of the present disclosure.
Figure 10A:
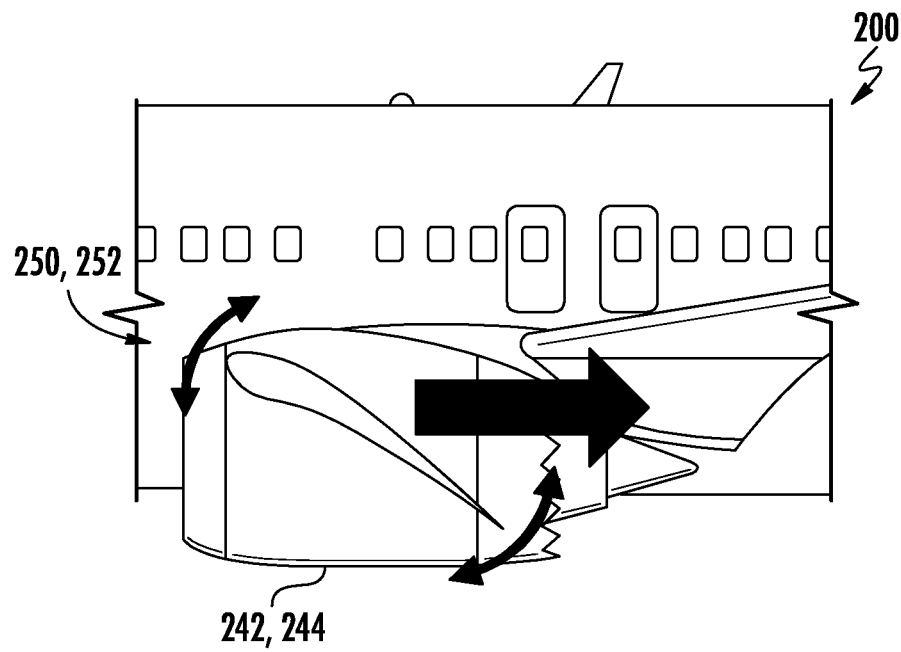
FIG. 10A is a close-up, port side view of an aircraft including an engine wing assembly in a second position in which the engine wing assembly provides a brake force in accordance with another exemplary embodiment of the present disclosure.
Figure 10B:
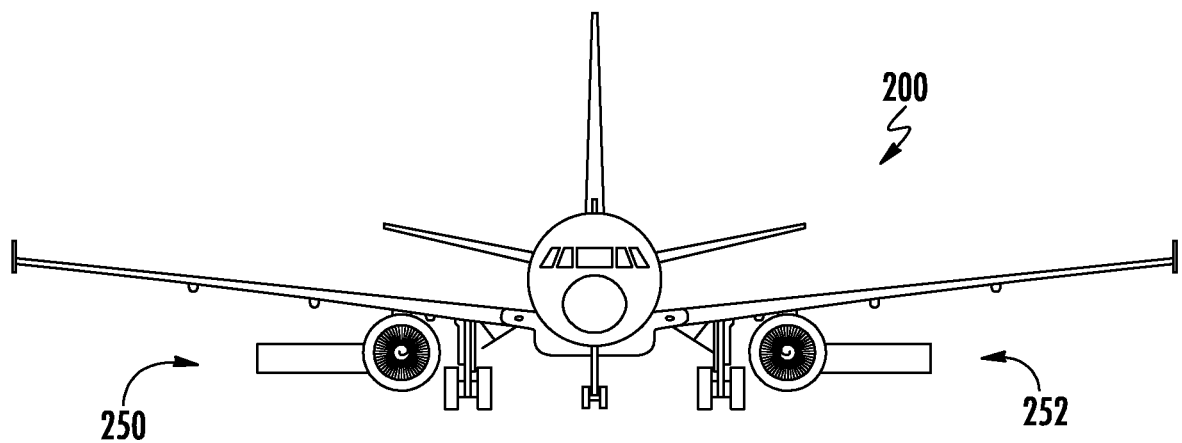
FIG. 10B is a front side view of an aircraft including an engine wing assembly in a second position in which the engine wing assembly provides a brake force in accordance with another exemplary embodiment of the present disclosure.

Referring to FIGS. 7 and 9-10B, the first engine wing assembly 250 is transitionable between a first position (FIG. 9) in which the first engine wing assembly 250 provides a lift force and a second position (FIGS. 10A-10B) in which the first engine wing assembly 250 provides a brake force. In other words, the first engine wing assembly 250 is able to have a variable geometry in relationship to its configuration with the engine 242. Referring to FIG. 9, in the first position, e.g., a takeoff or cruising position, the first engine wing assembly 250 provides a lift force to support the weight of the engine 242. Referring to FIGS. 7 and 9, in an exemplary embodiment, the first engine wing assembly 250 is transitionable between a varying degree of positions in the first position to assist in a variety of takeoff and cruising applications. Referring to FIGS. 10A-10B, in the second position, e.g., a landing position, the first engine wing assembly 250 provides a brake force to assist thrust reversers of the aircraft 200 in landing the aircraft 200. Referring to FIGS. 7 and 10A-10B, in an exemplary embodiment, the first engine wing assembly 250 is transitionable between a varying degree of positions in the second position to assist in a variety of landing applications. The first engine wing assembly 250 is able to be transitioned between a variety of the first and second positions by a hydraulic actuation system, a pneumatic actuation system, or similar actuation systems.

Furthermore, in the same manner, the second engine wing assembly 252 is transitionable between a first position (FIG. 9) in which the second engine wing assembly 252 provides a lift force and a second position (FIGS. 10A-10B) in which the second engine wing assembly 252 provides a brake force.

Figure 11:
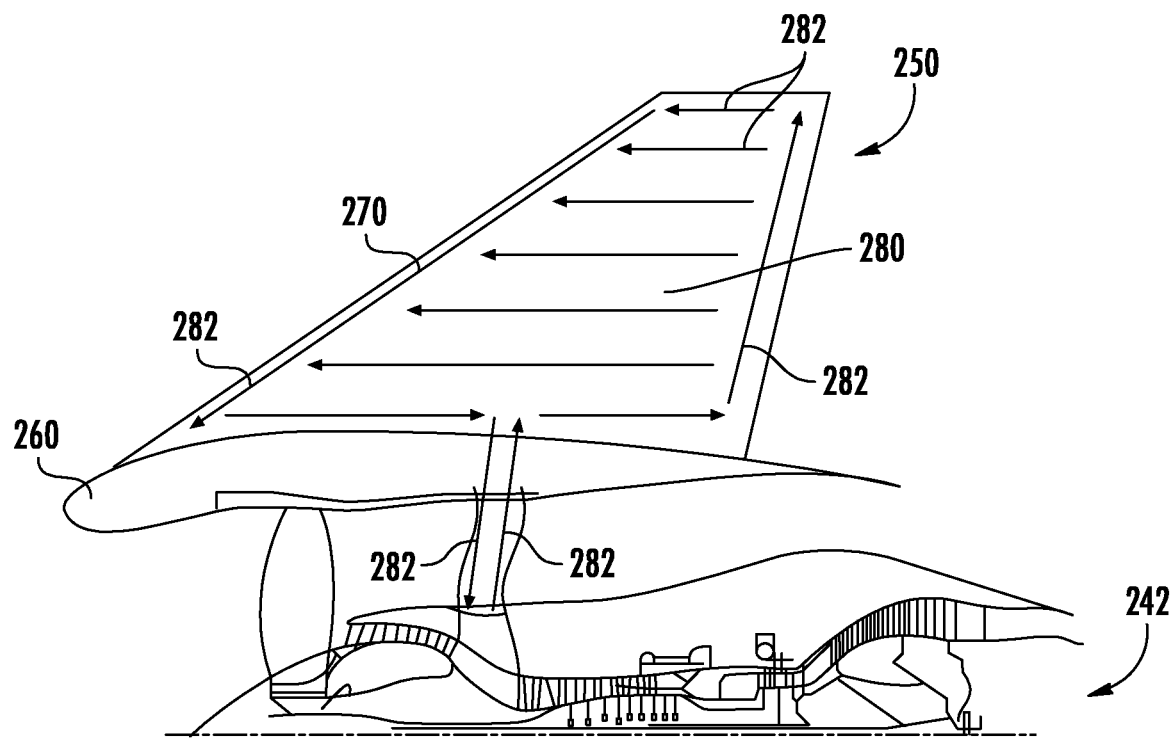
FIG. 11 is a schematic, partial cross-sectional view of a gas turbine engine including an engine wing assembly in accordance with another exemplary embodiment of the present disclosure.

Referring to FIG. 11, an additional benefit of an engine wing assembly 250 of the present disclosure will now be discussed. In an exemplary embodiment, a surface 280 of the first engine wing 270 absorbs a portion of heat from the first engine 242. For example, by attaching a first engine wing 270 to a portion of the first engine 242, e.g., a portion of the first nacelle 260, the first engine wing 270 provides a good surface 280 for heat transfer with components of the first engine 242 as shown in FIG. 11. Similarly, the second engine wing 272, the third engine wing 274, and the fourth engine wing 276 can be used for heat transfer with components of the respective engines 242, 244. In one embodiment, a hot fluid, e.g., an engine oil, is able to be passed from the engine 242 through an engine wing, e.g., a first engine wing 270, along a heat transfer flow path 282 to transfer and dump a portion of the heat of the hot fluid as shown in FIG. 11. In such an embodiment, the fluid can also be used as a wing actuator hydraulic mechanism.

Referring to FIGS. 5, 6, 8, and 12, additional exemplary embodiments of the present disclosure are illustrated. For example, referring to FIG. 5, in another exemplary embodiment, an aircraft 300 of the present disclosure may include a first engine wing assembly 302 extending outward from a first engine 242 and a second engine wing assembly 304 extending outward from a second engine 244. In the embodiment illustrated in FIG. 5, the first engine wing assembly 302 includes a single wing 306 extending laterally outwardly from an outer side 308 of a portion of the first engine 242 and the second engine wing assembly 304 includes a single wing 310 extending laterally outwardly from an outer side 312 of a portion of the second engine 244.

Figure 6:
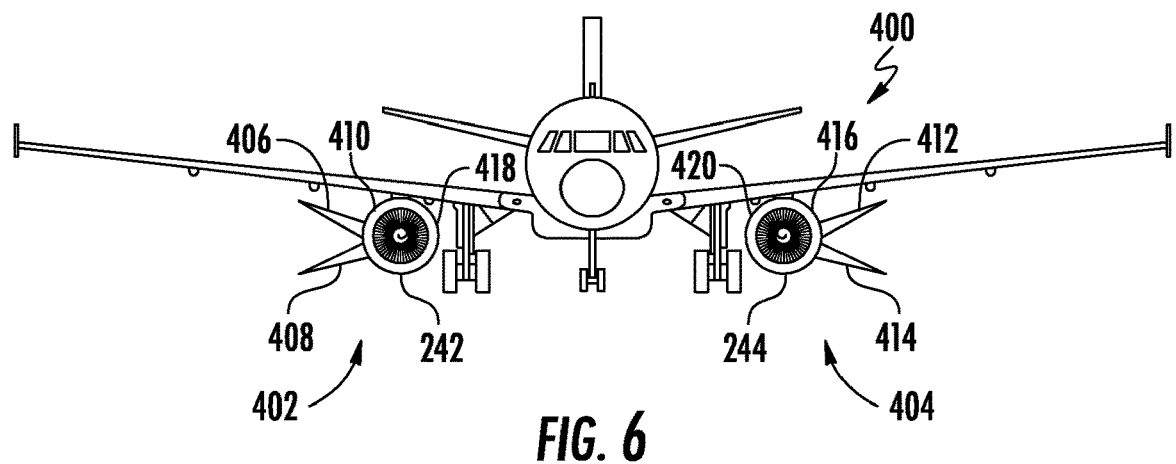
FIG. 6 is a front side view of an aircraft including an engine wing assembly in accordance with another exemplary embodiment of the present disclosure.

Referring to FIG. 6, in another exemplary embodiment, an aircraft 400 of the present disclosure may include a first engine wing assembly 402 extending outward from a first engine 242 and a second engine wing assembly 404 extending outward from a second engine 244. In the embodiment illustrated in FIG. 6, the first engine wing assembly 402 includes a first wing 406 and a second wing 408 each extending laterally outwardly from an outer side 410 of a portion of the first engine 242 and the second engine wing assembly 404 includes a first wing 412 and a second wing 414 each extending laterally outwardly from an outer side 416 of a portion of the second engine 244. In another exemplary embodiment, the first engine wing assembly 402 may also include two additional wings each extending laterally outwardly from an inner side 418 of a portion of the first engine 242 and the second engine wing assembly 404 may also include two additional wings each extending laterally outwardly from an inner side 420 of a portion of the second engine 244.

Figure 8:
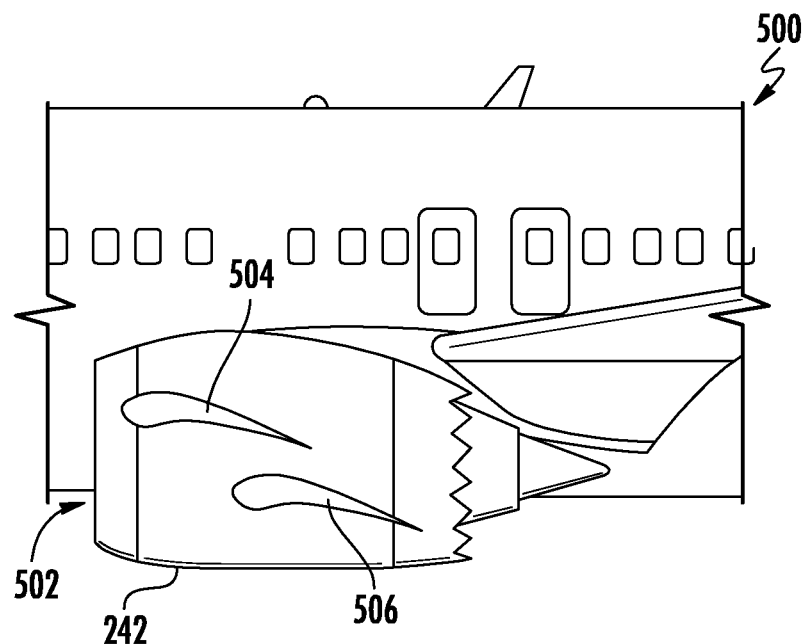
FIG. 8 is a close-up, port side view of an aircraft including an engine wing assembly in accordance with another exemplary embodiment of the present disclosure.

Referring to FIG. 8, in another exemplary embodiment, an aircraft 500 of the present disclosure may include a first engine wing assembly 502 extending outward from a first engine 242 and including a plurality of smaller wings. For example, in one embodiment, the first engine wing assembly 502 may include a first wing 504 and a second wing 506. In other embodiments, the first engine wing assembly 502 may include any number of wings in any number of different configurations for a desired application.

Figure 12:
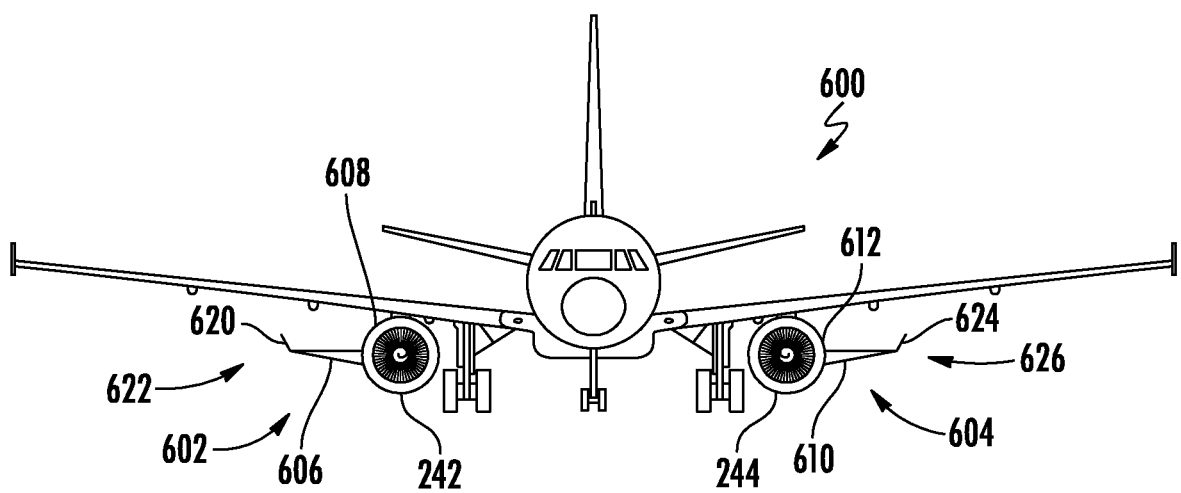
FIG. 12 is a front side view of an aircraft including an engine wing assembly including a winglet in accordance with another exemplary embodiment of the present disclosure.

Referring to FIG. 12, in another exemplary embodiment, an aircraft 600 of the present disclosure may include a first engine wing assembly 602 including a single wing 606 extending laterally outwardly from an outer side 608 of a portion of the first engine 242 and a second engine wing assembly 604 including a single wing 610 extending laterally outwardly from an outer side 612 of a portion of the second engine 244. Referring to FIG. 12, the first engine wing 606 includes a winglet 620 disposed at a wingtip portion 622 of the first engine wing 606 and the second engine wing 610 includes a winglet 624 disposed at a wingtip portion 626 of the second engine wing 610.

In other embodiments of the present disclosure, additional features and systems normally associated with a first primary wing 23 and a second primary wing 25 of a primary wing assembly 22 of an aircraft 10 may also be included with any of the configurations of an engine wing assembly of the present disclosure.

Further aspects of the invention are provided by the subject matter of the following clauses:

1. An aircraft defining a longitudinal centerline and extending between a forward end and an aft end, the aircraft comprising: a fuselage extending longitudinally between the forward end of the aircraft and the aft end of the aircraft; a primary wing assembly extending laterally outwardly with respect to the longitudinal centerline from a portion of the fuselage; a first engine mounted to the primary wing assembly; and a first engine wing assembly extending outward from the first engine.

2. The aircraft of any preceding clause, further comprising a first nacelle that circumferentially surrounds a portion of the first engine.

3. The aircraft of any preceding clause, wherein the first engine wing assembly comprises a first engine wing extending laterally outwardly from a first side of the first nacelle.

4. The aircraft of any preceding clause, wherein the first engine wing assembly comprises a first engine wing extending laterally outwardly from a first side of the first nacelle and a second engine wing extending laterally outwardly from a second side of the first nacelle opposite the first side of the first nacelle.

5. The aircraft of any preceding clause, wherein the primary wing assembly comprises a first primary wing extending laterally outwardly with respect to the longitudinal centerline from a first side of the fuselage and a second primary wing extending laterally outwardly with respect to the longitudinal centerline from a second side of the fuselage.

6. The aircraft of any preceding clause, wherein the first engine is mounted to the first primary wing, and the aircraft further comprises a second engine mounted to the second primary wing; a second engine wing assembly extending outward from the second engine; and a second nacelle that circumferentially surrounds a portion of the second engine.

7. The aircraft of any preceding clause, wherein the second engine wing assembly comprises a third engine wing extending laterally outwardly from a first side of the second nacelle.

8. The aircraft of any preceding clause, wherein the second engine wing assembly comprises a third engine wing extending laterally outwardly from a first side of the second nacelle and a fourth engine wing extending laterally outwardly from a second side of the second nacelle opposite the first side of the second nacelle.

9. The aircraft of any preceding clause, wherein the first engine wing assembly is transitionable between a first position in which the first engine wing assembly provides a lift force and a second position in which the first engine wing assembly provides a brake force.

10. The aircraft of any preceding clause, wherein the first engine wing includes a winglet disposed at a wingtip portion of the first engine wing.

11. The aircraft of any preceding clause, wherein the first engine wing assembly further comprises a rear stabilizer extending vertically outwardly from a top side of the first nacelle.

12. The aircraft of any preceding clause, wherein a surface of the first engine wing absorbs a portion of heat from the first engine.

13. A wing assembly for an aircraft defining a longitudinal centerline and extending between a forward end and an aft end and comprising a fuselage extending longitudinally between the forward end and the aft end, the wing assembly comprising: a primary wing assembly extending laterally outwardly with respect to the longitudinal centerline from a portion of the fuselage; a first engine mounted to the primary wing assembly; and a first engine wing assembly extending outward from the first engine.

14. The wing assembly of any preceding clause, further comprising a first nacelle that circumferentially surrounds a portion of the first engine; and a first engine wing extending laterally outwardly from a first side of the first nacelle.

15. The wing assembly of any preceding clause, wherein the primary wing assembly comprises a first primary wing extending laterally outwardly with respect to the longitudinal centerline from a first side of the fuselage and a second primary wing extending laterally outwardly with respect to the longitudinal centerline from a second side of the fuselage.

16. The wing assembly of any preceding clause, wherein the first engine is mounted to the first primary wing, and the aircraft further comprises a second engine mounted to the second primary wing; a second engine wing assembly extending outward from the second engine; a second nacelle that circumferentially surrounds a portion of the second engine; and a second engine wing extending laterally outwardly from a first side of the second nacelle.

17. The wing assembly of any preceding clause, wherein the first engine wing assembly is transitionable between a first position in which the first engine wing assembly provides a lift force and a second position in which the first engine wing assembly provides a brake force.

18. The wing assembly of any preceding clause, wherein the first engine wing includes a winglet disposed at a wingtip portion of the first engine wing.

19. The wing assembly of any preceding clause, wherein the first engine wing assembly further comprises a rear stabilizer extending vertically outwardly from a top side of the first nacelle.

20. An engine assembly for an aircraft defining a longitudinal centerline and extending between a forward end and an aft end and comprising a fuselage extending longitudinally between the forward end and the aft end and a primary wing assembly extending laterally outwardly with respect to the longitudinal centerline from a portion of the fuselage, the engine assembly comprising an engine mounted to the primary wing assembly; and an engine wing assembly extending outward from the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An aircraft defining a longitudinal centerline and extending between a forward end and an aft end, the aircraft comprising:
 a fuselage extending longitudinally between the forward end of the aircraft and the aft end of the aircraft;

a primary wing assembly extending laterally outwardly with respect to the longitudinal centerline from a portion of the fuselage;
a first engine mounted on a pylon to the primary wing assembly; and
a first engine wing assembly extending outward from the first engine, wherein the first engine wing assembly is separate and apart from the primary wing assembly, and wherein the first engine wing assembly does not contact any portion of the fuselage.

2. The aircraft of claim 1, further comprising:
a first nacelle that circumferentially surrounds a portion of the first engine.

3. The aircraft of claim 2, wherein the first engine wing assembly comprises:
a first engine wing extending laterally outwardly from a first side of the first nacelle.

4. The aircraft of claim 2, wherein the first engine wing assembly comprises:
a first engine wing extending laterally outwardly from a first side of the first nacelle and a second engine wing extending laterally outwardly from a second side of the first nacelle opposite the first side of the first nacelle.

5. The aircraft of claim 3, wherein the primary wing assembly comprises:
a first primary wing extending laterally outwardly with respect to the longitudinal centerline from a first side of the fuselage and a second primary wing extending laterally outwardly with respect to the longitudinal centerline from a second side of the fuselage.

6. The aircraft of claim 5, wherein the first engine is mounted to the first primary wing, and the aircraft further comprises:
a second engine mounted to the second primary wing;
a second engine wing assembly extending outward from the second engine; and
a second nacelle that circumferentially surrounds a portion of the second engine.

7. The aircraft of claim 6, wherein the second engine wing assembly comprises:
a third engine wing extending laterally outwardly from a first side of the second nacelle.

8. The aircraft of claim 6, wherein the second engine wing assembly comprises:
a third engine wing extending laterally outwardly from a first side of the second nacelle and a fourth engine wing extending laterally outwardly from a second side of the second nacelle opposite the first side of the second nacelle.

9. The aircraft of claim 1, wherein the first engine wing assembly is transitionable between a first position in which the first engine wing assembly provides a lift force and a second position in which the first engine wing assembly provides a brake force.

10. The aircraft of claim 3, wherein the first engine wing includes a winglet disposed at a wingtip portion of the first engine wing.

11. The aircraft of claim 3, wherein the first engine wing assembly further comprises:
a rear stabilizer extending vertically outwardly from a top side of the first nacelle.

12. The aircraft of claim 3, wherein a surface of the first engine wing absorbs a portion of heat from the first engine.

13. A wing assembly for an aircraft defining a longitudinal centerline and extending between a forward end and an aft end and comprising a fuselage extending longitudinally between the forward end and the aft end, the wing assembly comprising:
a primary wing assembly extending laterally outwardly with respect to the longitudinal centerline from a portion of the fuselage;
a first engine mounted on a pylon to the primary wing assembly; and
a first engine wing assembly extending outward from the first engine, wherein the first engine wing assembly is separate and apart from the primary wing assembly, and wherein the first engine wing assembly does not contact any portion of the fuselage.

14. The wing assembly of claim 13, further comprising:
a first nacelle that circumferentially surrounds a portion of the first engine; and
a first engine wing extending laterally outwardly from a first side of the first nacelle.

15. The wing assembly of claim 14, wherein the primary wing assembly comprises:
a first primary wing extending laterally outwardly with respect to the longitudinal centerline from a first side of the fuselage and a second primary wing extending laterally outwardly with respect to the longitudinal centerline from a second side of the fuselage.

16. The wing assembly of claim 15, wherein the first engine is mounted to the first primary wing, and the aircraft further comprises:
a second engine mounted to the second primary wing;
a second engine wing assembly extending outward from the second engine;
a second nacelle that circumferentially surrounds a portion of the second engine; and
a second engine wing extending laterally outwardly from a first side of the second nacelle.

17. The wing assembly of claim 13, wherein the first engine wing assembly is transitionable between a first position in which the first engine wing assembly provides a lift force and a second position in which the first engine wing assembly provides a brake force.

18. The wing assembly of claim 14, wherein the first engine wing includes a winglet disposed at a wingtip portion of the first engine wing.

19. The wing assembly of claim 14, wherein the first engine wing assembly further comprises:
a rear stabilizer extending vertically outwardly from a top side of the first nacelle.

20. An engine assembly for an aircraft defining a longitudinal centerline and extending between a forward end and an aft end and comprising a fuselage extending longitudinally between the forward end and the aft end and a primary wing assembly extending laterally outwardly with respect to the longitudinal centerline from a portion of the fuselage, the engine assembly comprising:
an engine mounted on a pylon to the primary wing assembly; and
an engine wing assembly extending outward from the engine, wherein the engine wing assembly is separate and apart from the primary wing assembly, and wherein the engine wing assembly does not contact any portion of the fuselage.

* * * * *